United States Patent [19]

Tsurumoto et al.

[11] 4,447,713

[45] May 8, 1984

[54] POWER SUPPLY UNIT FOR ELECTRIC DISCHARGE MACHINE

[75] Inventors: Kazuo Tsurumoto; Yoshio Ozaki, both of Aichi, Japan

[73] Assignee: Mitsubishi Denki Kabushiki Kaisha, Tokyo, Japan

[21] Appl. No.: 345,847

[22] Filed: Feb. 4, 1982

[30] Foreign Application Priority Data

Feb. 13, 1981 [JP] Japan ................................. 56-19727

[51] Int. Cl.³ ............................................. B23P 1/08
[52] U.S. Cl. ................................ 219/69 G; 219/69 S; 219/69 P
[58] Field of Search ................ 219/69 P, 69 C, 69 M, 219/69 S, 69 W, 69 R

[56] References Cited

U.S. PATENT DOCUMENTS

| Re. 28,734 | 3/1976 | Inoue | 219/69 P |
| 3,604,885 | 9/1971 | Inoue | 219/69 P |
| 3,655,936 | 4/1972 | Saito et al. | 219/69 P |
| 4,242,555 | 12/1980 | Delpretti | 219/69 C |
| 4,347,425 | 8/1982 | Obara | 219/69 P |

FOREIGN PATENT DOCUMENTS 53-72290  6/1978  Japan ................................. 219/69 P Primary Examiner—M. H. Paschall
Attorney, Agent, or Firm—Sughrue, Mion, Zinn, Macpeak & Seas

[57] ABSTRACT

The present invention relates to a power supply unit for an electric discharge device of the type used in electric discharge machining. First and second DC sources are employed, and the output of the two sources are applied to the machining gap, by way of main and auxiliary switching circuits. The output of the first DC source is applied to the machining gap initially, and a discrimination device operates to detect whether normal electric discharge takes place. The second DC source is applied to the machining gap in dependence upon the operation of the main switching circuit, the operation of which is in turn dependent upon the output of the discrimination circuit and a delay pulse derived from an oscillator which initiates the closure of said auxiliary switching circuit.

8 Claims, 15 Drawing Figures

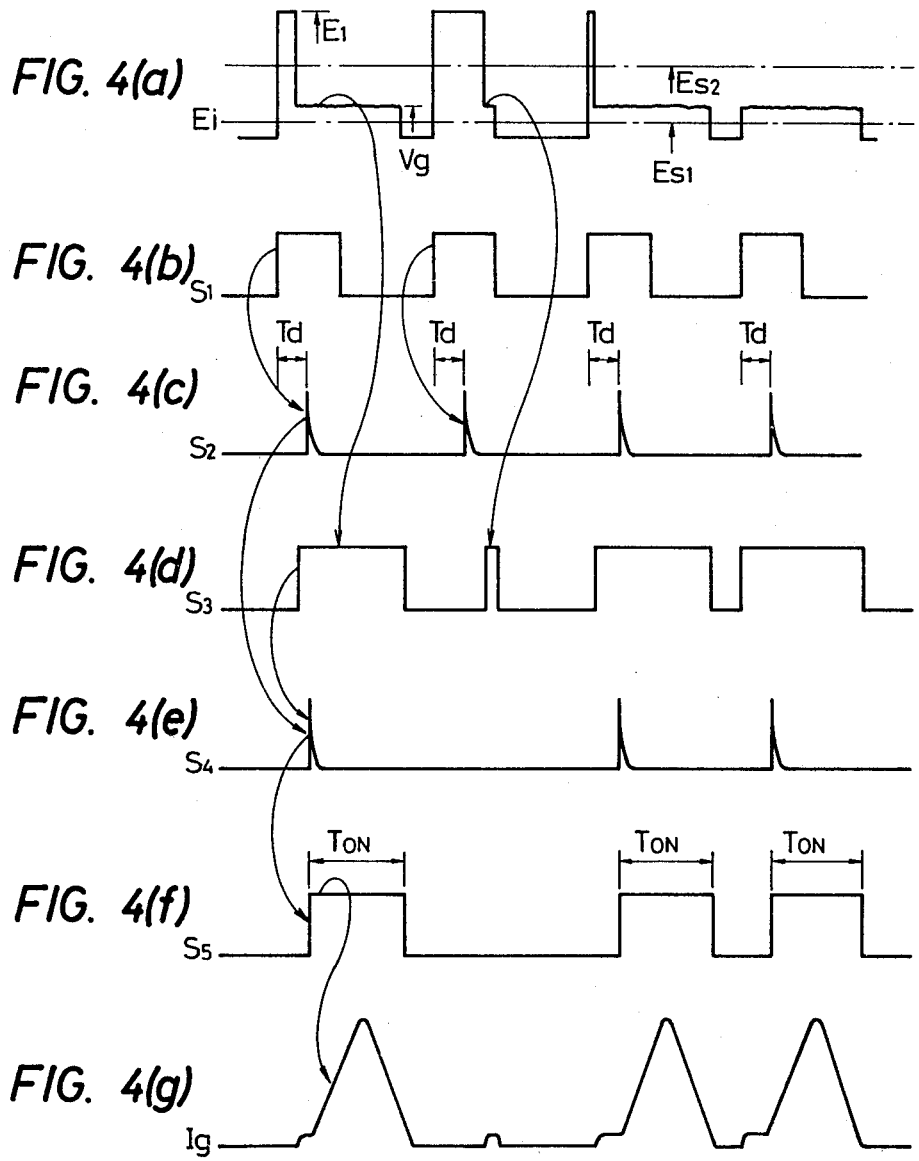

POWER SUPPLY UNIT FOR ELECTRIC DISCHARGE MACHINE

BACKGROUND OF THE INVENTION

This invention relates to a power supply unit for an electric discharge machine, and more particularly to a power supply unit for a wire cut type electric discharge machine.

In a conventional power supply unit of this type, as shown in FIG. 1(a), the output of a DC source 10 is applied through a resistor 12 and a switching circuit 14 to a discharging capacitor 16, to increase the voltage across the terminals of the capacitor 16. When the voltage is increased to the extent that the insulation in the machining gap between a wire electrode 18 and a workpiece 20 is overcome, the electrostatic energy stored in the capacitor 16 is discharged by electric discharge (or spark discharge) which takes place in the machining gap, as a result of which this energy is converted into the thermal energy by which the workpiece 20 is machined. The switching circuit 14, comprising a semiconductor switching element such as a transistor, is periodically opened and closed by a pulse signal from an oscillator 22. The waveforms of the voltage and current, which are applied to the machining gap through the switching circuit 14, are not always constant as shown in FIGS. 1(b) and 1(c); in other words, they are variable. This variation is due to the following reasons: A machining solution is generally jetted into the machining gap and metal particles created by machining lie within the gap. Therefore, the electric insulating conditions of the machining gap vary with time, whereby the discharge starting voltage is different every time. Thus, the discharge energy is also different every time. Because of this fluctuation, the opportunity for improvements in machining accuracy and surface roughness are limited with the conventional power supply unit shown in FIG. 1(a). In order to increase the machining speed, it is essential to increase the discharge energy. For this purpose, it is necessary to increase either the capacitance of the capacitor 16 or the output voltage E of the DC source 10. However, an increase in the capacitance, or in the output voltage is liable to break the wire electrode 18, as is well known in the art. For this reason, improvement in the machining speed is also limited with the conventional unit.

Another example of a conventional power supply unit is arranged as shown in FIG. 2(a). In this unit, a discharging capacitor 16 is not used, and the output of a DC source 10 is applied through a switching circuit 14 directly to the machining gap. Since the discharging capacitor is not employed in this unit, the discharge current must have a large peak value and a small pulse width. For this purpose, a large discharge pulse current exhibiting a considerably abrupt transient phenomenon must be applied directly to the machining gap. However, to practically do so is considerably difficult since one is limited by the switching speed characteristic or peak capacity of the semiconductor switching element or affected by the electric path distribution inductance. Thus, the waveforms of the voltage and current in the unit shown in FIG. 2(a) are variable as shown in FIGS. 2(b) and 2(c). In addition, because of the above-described difficulties, any increase in the machining speed remains limited.

SUMMARY OF THE INVENTION

In view of the foregoing, an object of this invention is to provide a power supply unit for an electric discharge machine, which, even if the conditions of the machining gap change with time, can supply relatively uniform discharge energy, thereby improving machining speed and accuracy.

The present invention resides in a power supply unit for an electric discharge machine in which arc discharge is caused intermittently in a machining gap between an electrode and a workpiece, to machine the workpiece; which unit, according to the invention, includes: a first DC source, the voltage of which can be varied; an auxiliary switching circuit which is opened and closed by a periodic pulse signal to control the application of the output of the first DC source to the machining gap; a second DC source whose output voltage is higher than that of the first DC source; a main switching circuit having a semiconductor switch element which is opened and closed to control the application of the output of the second DC source to the machining gap, and having a peak current supply capacity larger than that of the auxiliary switching circuit; and a discriminating device, which detects the electrical conditions in the machining gap when a predetermined period of time passes after the output voltage of the first DC source is applied to the machining gap, to discriminate the conditions in the machining gap, with the main switching circuit being opened and closed according to the output of the discriminating device.

BRIEF DESCRIPTION OF THE DRAWINGS

FIG. 1(b) is a waveform diagram showing the operating voltage of the unit of FIG. 1(a) while

FIG. 2(b) is a waveform diagram showing the operating voltage of this unit, while

FIGS. 4(a)-4(g) are waveform diagrams for describing the operation of various parts of the unit shown in FIG. 3.

DETAILED DESCRIPTION OF THE PREFERRED EMBODIMENTS

One preferred embodiment of the invention will be described with reference to FIGS. 3 and 4.

Figure 1A:
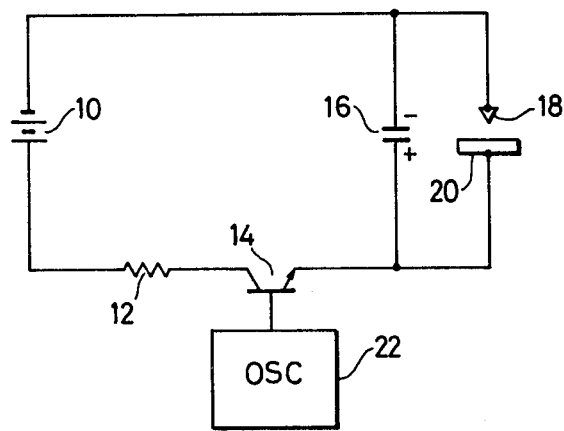
FIG. 1(a) is a circuit diagram showing one example of a conventional power supply unit for an electric discharge machine.
Figure 1B:
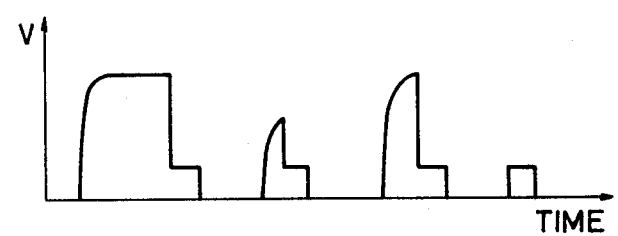
Figure 1C:
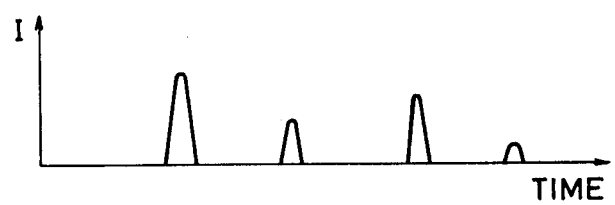
FIG. 1(c) is a waveform diagram showing the operating current of the unit.
Figure 2A:
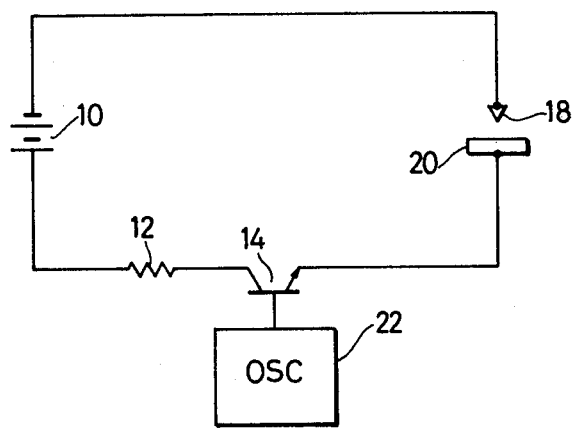
FIG. 2(a) is a circuit diagram illustrating another example of a power supply unit.
Figure 2B:
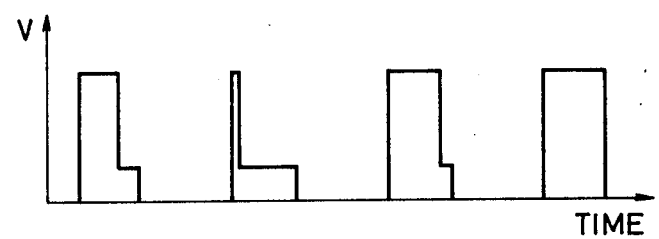
Figure 2C:
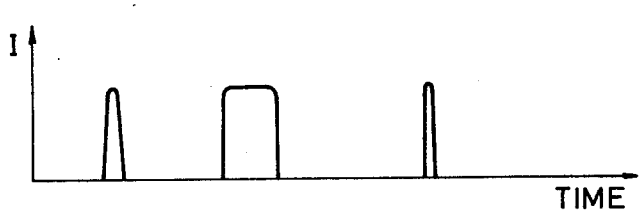
FIG. 2(c) is a waveform diagram showing the operating current thereof.
Figure 3:
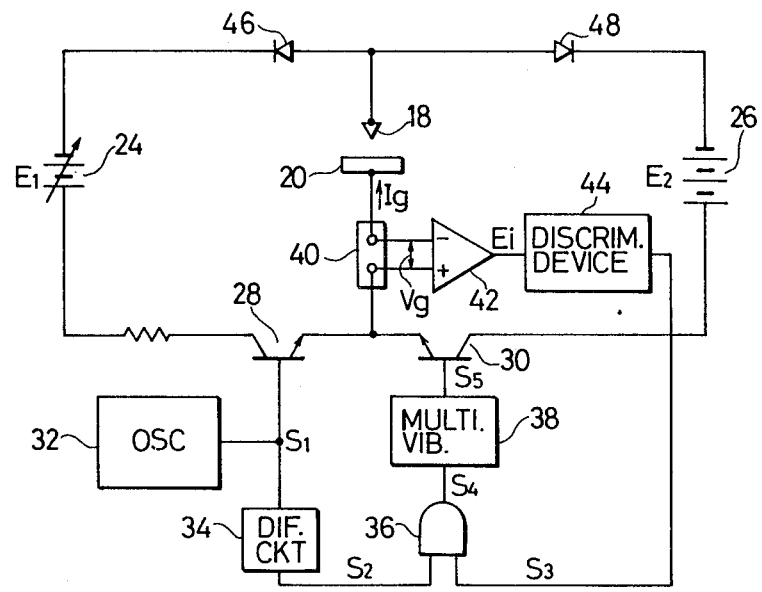
FIG. 3. is a circuit diagram showing one example of a power supply unit for an electric discharge machine, according to the present invention.

FIG. 3 shows one example of a power supply unit for an electric discharge machine. The unit includes a first DC source 24, the voltage of which can be changed; and a second DC source 26. Ordinarily, the voltage $E_1$ of the first DC source 24 and the voltage $E_2$ of the second DC source 26 are set so as to satisfy ($E_1 < E_2$). The application of the output of the first DC source 24 is controlled by an auxiliary switching circuit 28, while the application of the output of the second DC source 26 is controlled by a main switching circuit 30. The switching circuits 28 and 30 are composed of large capacity semiconductor switches. For ease of illustration, the main switching circuit 30 is shown as one transistor; however, the circuit 30 is actually made up of a number of high-speed large capacity switching transistors, so as to have a large switching capacity. The unit, as shown in FIG. 3, further includes a self-oscillator 32 for periodically generating a pulse signal; a delay and differentiation circuit 34 connected to the output terminal of the oscillator 32; an AND gate 36; a one-shot multivibrator 38 which operates in response to the rise of the output of the AND gate 36; a shunt resistor 40; a differential amplifier 42 which detects current in the resistor 40 from a voltage across the resistor 40, and amplfifies it; and a discriminating device 44 which, according to the output of the amplifier 42, provides an output at a logic level "1" or "O". Reverse current blocking diodes 46 and 48 are connected in series with the DC sources 24 and 26, respectively. The discriminating device 44 is so designed as to discriminate, according to the voltage across the shunt resistor 40, the variation which occurs when an electric discharge takes place in the machining gap between the wire electrode 18 and the workpiece 20, thereby to provide the aforementioned high and low level outputs. The auxiliary switching circuit 28 is periodically operated (opened and closed) by the pulse signal from the oscillator. The main switching circuit 30 is operated by the output of the one-shot multivibrator 38.

The discriminating device 44 has two reference voltages $E_{s1}$ and $E_{s2}$ ($0 < E_{s1} < E_{s2}$) against which the input voltage $E_i$ is compared. The reference voltages are selected so as to satisfy ($E_{s1} < E_i < E_{s2}$) when the input voltage $E_i$ is at a value which is obtained when the electric discharge is normally carried out (cf. FIG. 4). Only when $E_{s1} < E_i < E_{s2}$ does the device 44 provide the output "1". When $E_{s2} < E_i$, no electric discharge takes place, and the device 44 provides the output "O". When $E_1 < E_{s1}$, the electrode contacts the workpiece, and the device 44 provides the output "O".

The operation of the power supply unit shown in FIG. 3 will be described with reference to waveform diagrams shown in parts (a) through (g) of FIG. 4.

The output $S_3$ (FIG. 4(d)) of the discriminating device 44 and the output $S_2$ (FIG. 4(c)) of the delay and differentiation circuit 34, which is derived from the signal output $S_1$ (FIG. 4(b)) of the oscillator 32, are input to the AND gate 36. The resultant output $S_4$ (FIG. 4(e)) is then employed to trigger the vibrator 38. The output $S_5$ (FIG. 4(f)) of the vibrator 38 thus triggered is used to close the main switching circuit 30.

Thus, the auxiliary switching circuit 28 is rendered conductive, to apply the voltage $E_1$ to the machining gap. When a predetermined delay time $T_d$ passes after the application of the voltage $E_1$, the main switching circuit 30 may be operated, depending on whether or not electric discharge is taking place.

More specifically, only if electric discharge takes place normally with the output voltage $E_1$ by the time $T_d$ does the second DC source 26 provide a relatively high output voltage and peak current, in succession, to maintain the electric discharge for the output duration time $T_{ON}$ of the multivibrator 38. As the electric discharge is continued by the second DC source 26 as described above, a large peak current is applied to the machining gap immediately from the beginning of the electric discharge. Accordingly, even if the electrical conditions of the machining gap are changed, the waveform of the discharge current $I_g$ is uniform as shown in FIG. 4(g), and a large peak current can be supplied. In this case, the applied voltage $V_g$ does not exceed the voltage $E_1$ of the first DC source, as shown in FIG. 4(a). Accordingly, by changing the voltage $E_1$ of the first DC source 24, the electric discharge start voltage can be selected irrespective of the discharge energy. Accordingly, the electric discharge start voltage can be set to a suitable value which will not promote breakage of the wire electrode.

The foregoing description is intended for illustrative pruposes, and many modifications will be apparent to one of skill in the art.

Figure 5:
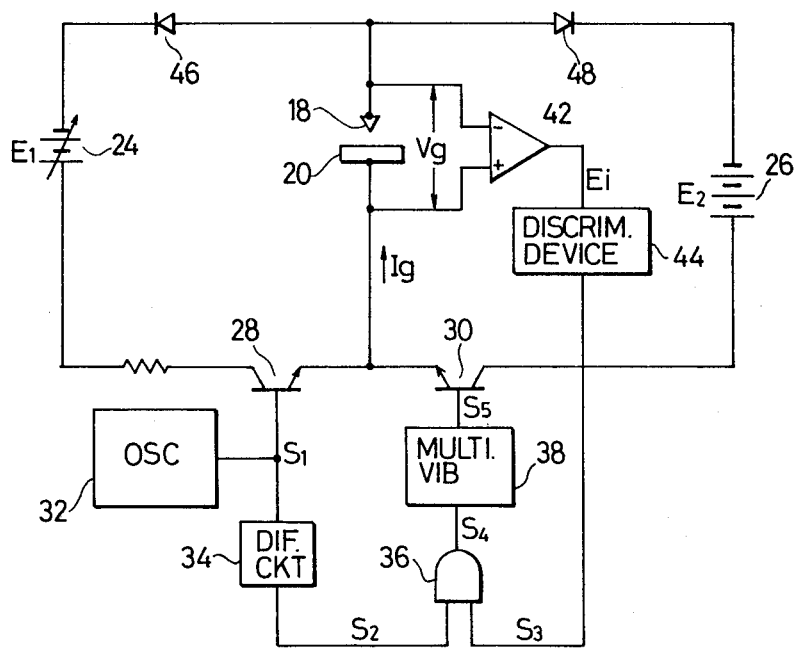
FIG. 5 illustrates a modification of the power supply circuit of FIG. 3.

For example, one modification of the power supply unit of FIG. 3 is shown in FIG. 5. In this modification, the interelectrode state is discriminated according to the gap voltage $V_g$. The differential amplifier 42 is directly coupled to the wire-shaped electrode 18 and to the workpiece 20, while the discriminating circuit 44 operates to discriminate between normal operation, short-circuit and non-discharge states in accordance with the output of the differential amplifier 42.

As is apparent from the above description, the electric discharge machine power supply unit according to the invention can supply relatively uniform discharge energy even if the conditions of the machining gap are varied with time. Therefore, the use of the invention can improve machining accuracy and especially the surface roughness of the workpiece, and increase machining speed.

What is claimed is:
1. A power supply unit for an electric discharge device wherein arc discharge is intermittently caused in a machining gap between an electrode and a workpiece to be machined, said power supply unit comprising:
   a first DC source, the voltage of said source being variable;
   auxiliary switching means for controlling the application of an output of said first DC source to said machining gap, said auxiliary switching means being opened and closed in response to a periodic pulse signal;
   a second DC source, said second source having an output voltage which is higher than that of said first DC source;
   main switching means for applying an output of said second DC source to said machining gap for a constant duration when activated, said main switching circuit being activated by a discriminating signal and including a semiconductor switch element and having a peak current supply capacity larger than that of said auxiliary switching means; and
   a discriminating device for detecting the electrical condition of said machining gap a predetermined period of time after said output voltage of said first DC source is applied to said machining gap, said discriminating device discriminating between short circuit, normal discharge and non-discharge states and providing said discriminating signal only if a discharge is occurring after said predetermined time has passed.
2. A power supply unit as claimed in claim 1, further comprising oscillator means for generating said periodic pulse signal.
3. A power supply unit as claimed in claim 2, further comprising AND circuit means, and delay and differen- tiation means, said delay and differentiation means receiving said periodic pulse signal and generating a delayed output signal forming one input of said AND circuit.

4. A power supply unit as claimed in claim 3, said output of said discriminating device forming a second input of said AND circuit, said discriminating device having a high level output only during normal electric discharge of said discharge device.

5. A power supply unit as claimed in claim 1, wherein said discriminating device is comprised of means for comparing an input voltage with two reference voltages, said references voltages being selected such that the range between said voltages corresponds to normal electric discharge of said discharge device.

6. A power supply unit as claimed in claim 4, said unit further including multivibrator means receiving an output of said AND circuit, which, when triggered, closes said main switching means.

7. A power supply units as claimed in claim 1, said unit including a shunt resistor electrically connected to said workpiece, and amplifier means connected across said resistor, an output of said amplifier forming an input of said discriminating device.

8. A power supply unit as claimed in claim 1, said unit including an amplifier connected across said machining gap, an output of said amplifier forming an input of said discriminating device.

* * * * *